United States Patent [19]

Garcia

[11] Patent Number: 5,668,653
[45] Date of Patent: Sep. 16, 1997

[54] HIGH-SPEED SWITCH FOR FAST ROUTING OF DATA PACKETS

[75] Inventor: Joseph P. Garcia, Greenbelt, Md.

[73] Assignee: The United States of America as represented by the Secretary of the Navy, Washington, D.C.

[21] Appl. No.: 504,196

[22] Filed: Jul. 19, 1995

[51] Int. Cl.⁶ .............................. H04J 14/08; H04Q 11/04
[52] U.S. Cl. ........................ 359/140; 359/118; 359/128; 359/139; 370/356; 370/353
[58] Field of Search .................................. 359/117, 118, 359/128, 139, 140, 163, 173; 385/16–17, 24; 370/60, 60.1, 85.2, 85.3, 355, 356, 353

[56] References Cited

U.S. PATENT DOCUMENTS 4,894,818  1/1990  Fujioka et al. ...................... 359/117

FOREIGN PATENT DOCUMENTS 0547836  6/1993  European Pat. Off. ............... 359/139

*Primary Examiner*—Kinfe-Michael Negash
*Attorney, Agent, or Firm*—James B. Bechtel, Esq.

[57] ABSTRACT

A switching arrangement is disclosed that interconnects a plurality of processors forming a multi-processor computer system. The switching arrangement comprises optical delay lines that cooperate with microwave switching devices to, provide high speed switching of data packets of the multi-processor computer system. The optical delay lines temporarily store data packets for a sufficient time to allow for the contention resolution circuit to establish priority for any of the data packets that may be competing for a single source. The switching arrangement allows for the servicing of the data packets within a maximum of a few cycles of the clock rate of the computer system and a minimum of less than one clock cycle.

10 Claims, 7 Drawing Sheets

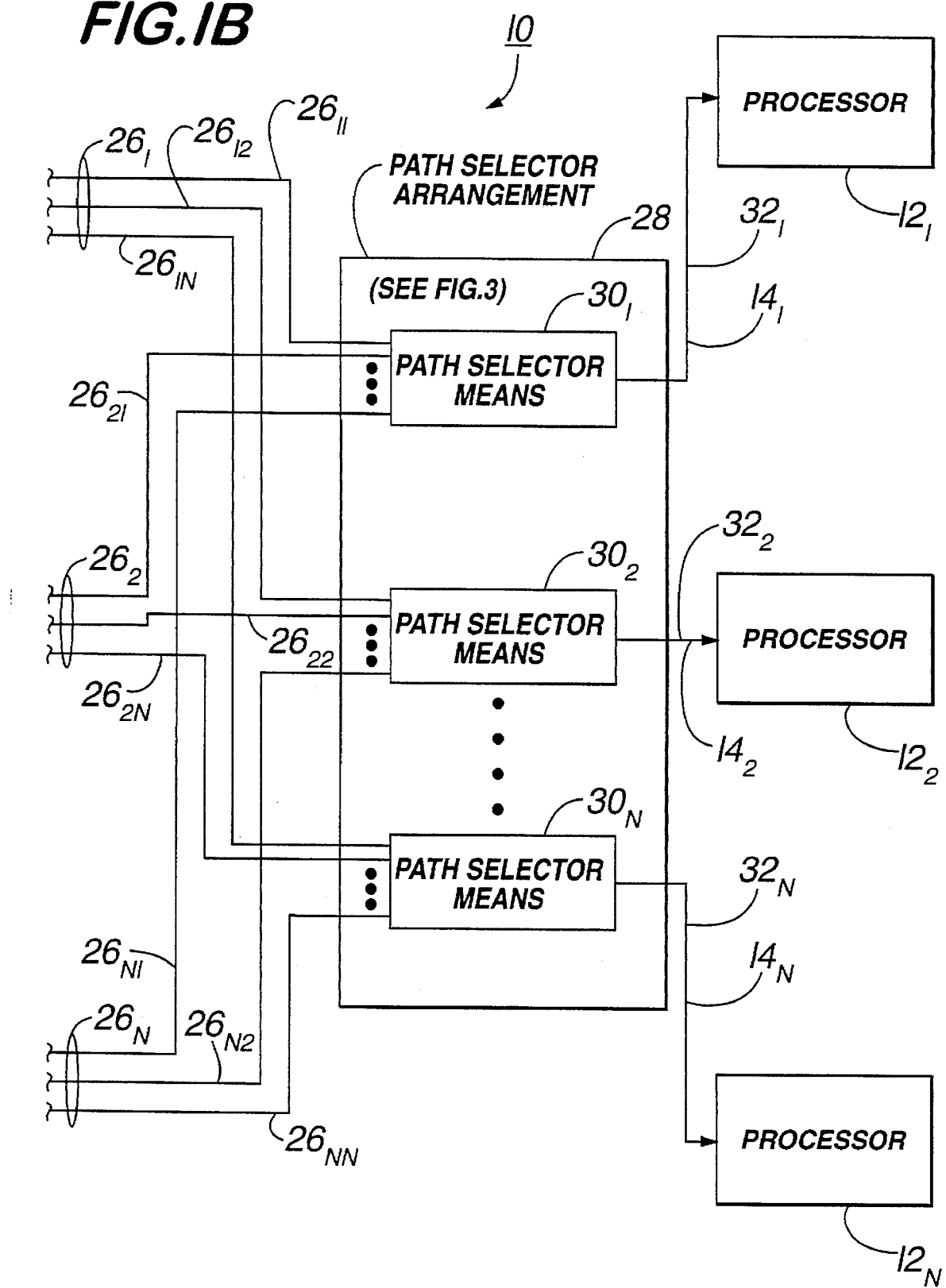

HIGH-SPEED SWITCH FOR FAST ROUTING OF DATA PACKETS

STATEMENT OF GOVERNMENT'S INTEREST

The invention described herein may be manufactured or used by or for the Government of the United States of America for governmental purposes without the payment of any royalty thereon or therefor.

CROSS-REFERENCE TO RELATED APPLICATIONS

This application is related to U.S. patent application Ser. No. 08/504,342, filed Jul. 19, 1995 (Attorney Docket No. 74,560), assigned to the same assignee as the present invention, and herein incorporated by reference.

FIELD OF THE INVENTION

This invention relates generally to high-speed switching and, more particularly, to high-speed switching of data packets for a multi-processor computer system.

BACKGROUND OF THE INVENTION

Multi-computer communications systems commonly employ packet switching techniques for handling high-volume data in a computer network by breaking apart data messages into fixed length packets that are transmitted to a destination, commonly a memory location, through the most expedient route. Switching techniques, and switches thereof, are especially useful for interconnecting processors in multiprocessor computers and should be applicable to recent transmission standards, such as scalable coherent interface (SCI). The switching of fixed length packets are commonly performed in accordance with International Communication Standards, such as the broadband integrated services digital network (BISDN) for transmitting voice, video and data over a data communication line. A data packet switching unit that arranges output data so as to be staggered in time is described in European Patent 547836, herein incorporated by reference. It is desired that data packet switching be provided without having to rely on arranging data so as to be staggered in time and yet still providing synchronization between the multiple computers comprising the communication system.

In a multi-processor communication system, it is important to have a rapidly reconfigurable interconnecting switch so that any one processor may communication with any other processor within the shortest possible latency, that is, within the shortest possible time between initiating a request for data and the beginning of the actual data transfer. In the multi-processor communication system, simultaneous processing may be performed with two or more processors processing together and any unnecessary latency would degrade the corresponding results.

Conventional digital switches, such as a banyan switch known in the art, require many clock cycles to set up an interconnection during a reconfiguration operation of the multi-processors of the communication system, thus, limiting the minimum time of the latency parameter, thus, limiting the latency to at least many clock cycles. It is desired that the reconfigurability of the multi-processor computer system be accomplished in the shortest possible time and not be restricted to multiple clock cycles.

It is a primary object of the present invention to provide a network interconnecting switch for rapidly interconnecting processors in a multi-processor communication system within a maximum time of a few clock cycles and a minimum time of less than one clock cycle and yet provide synchronization between the processors.

It is another object of the present invention to provide a network interconnecting switch that provides contention resolution means between one or more processors that are competing for the same resource, such as the same location in a memory within one of the processors.

It is a further object of the present invention to provide for a network interconnecting switch utilizing optical and optoelectronic devices brought together by optical fibers serving as waveguide elements.

SUMMARY OF THE INVENTION

This invention is directed to a network switching arrangement for interconnecting a plurality of processors, comprising a multi-processor communication system, and doing so within a maximum time of a few clock cycles of the communication system and a minimum time of less than one clock cycle of the communication system.

The network switching arrangement comprises a plurality of decoders, a plurality of delay line memories, a plurality of path selector switches, a plurality of light responsive devices, a plurality of repeater switches, wherein each of the pluralities comprises a number, (n). The network switching arrangement further comprises a plurality of optoelectronic means and a contention resolution means. The network switching arrangement interconnects the plurality of processors of the number (n) each generating data some of which might simultaneously be present.

The plurality of decoders is respectively connected to the plurality of processors and generate a first control signal responded to by the respective processor by generating data which are received and decoded by the connected decoder to determine an intended designation thereof and to generate a corresponding decoder output signal therefor. Each of the plurality of delay line memories has a predetermined time delay and is respectively connected to one of the plurality of decoders and responsive to the decoder output signal to temporarily store data by circulating the data therein. The plurality of optoelectronic means is respectively connected to the plurality of decoders and responsive to the respective decoder output signals to convert the respective data into light pulse signals having corresponding intensities. The plurality of path selector switches is respectively connected to the plurality of optoelectronic means and responsive to the respective decoder output signals so as to transmit the respective light pulse signals. The plurality of light responsive devices is respectively connected to the plurality of the path selector switches and receive and convert the respective light pulse signals into electrical voltage signals having an amplitude proportional to the corresponding light intensity of the light pulse signal. The contention resolution means receives the electric voltage signal from each of the plurality of light responsive devices, some of which signals might simultaneously be present, and responds to the electric voltage signal having the highest initial amplitude and generating a respective second control signal therefor. The plurality of repeater switches are respectively connected to the plurality of path selector switches and have means responsive to the second control signal to direct the respective data being circulated in the delay line memory onto the respective path selector switches which, in turn, are directed onto the respective repeater switches. The respective repeater switches route the directed data to the intended designation of the respective decoder.

BRIEF DESCRIPTION OF THE DRAWINGS

A more complete appreciation of the invention and many of its intended advantages may be readily appreciated as the same becomes better understood by reference to the following detailed description when considered in connection with the accompanying drawings wherein.

DETAILED DESCRIPTION OF THE PREFERRED EMBODIMENTS

Figure 1A:
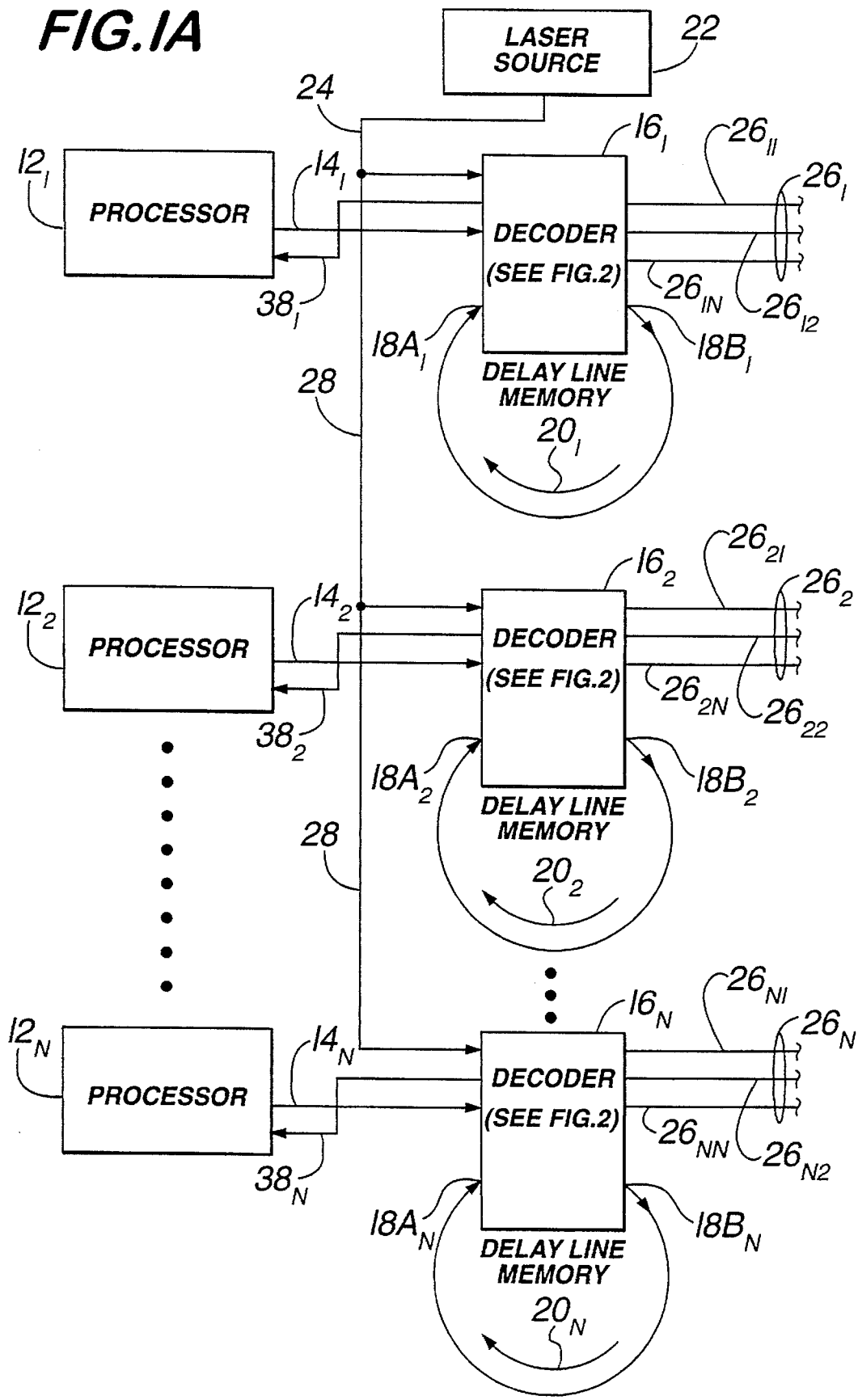
FIG. 1 is a block diagram illustrating the interconnections of the plurality of processors comprising the multi-processor computer system of the present invention.

Referring to the drawings in detail, wherein the same reference numbers indicate the same elements, there is shown in FIG. 1 a block diagram of a network switching arrangement 10 of the present invention. The network switching arrangement 10 interconnects a plurality of processors $12_1, 12_2, \ldots 12_N$ having a number, n, so as to configure these processors to form a multi-processor computer system that allows for the simultaneous processing by one or more of the processors. The one or more processors are interconnected so that the general work load assigned to the multi-processor computer system may be shared between them in an efficient manner. The sharing of the tasks between the processors is determined, in part, by the ability to correctly interpret messages in the form of data commonly contained in packets and usually being of a relatively high volume occurring at a rapid rate.

Switching of the data packets is accomplished by breaking apart messages into fixed length packets that are transmitted to their destination through the most expedient route. The network switching arrangement 10 accommodates data packet switching and conforms to International Telecommunication Standards, such as the broadband integrated services digital network (BISDN) and does so while holding the latency to no more than a few clock cycles of the multi-processor computer system, while at the same time allowing synchronous communication between the processors $12_1, 12_2, \ldots 12_N$. The processors $12_1, 12_2, \ldots 12_N$ each respectively generates data, in particular, data packets $14_1, 14_2, \ldots 14_N$, some of which data packets might simultaneously be present and some of which data may designate the same memory address in the same processors $12_1, 12_2 \ldots 12_N$.

The network switching arrangement 10 is preferably configured in a nxn array, with, n, corresponding to the number of processors $12_1, 12_2 \ldots 12_N$ and also to the other elements indicated in FIGS. 1–4 with a subscript N. The network switching arrangement 10 is illustrated in FIG. 1 with the processors $12_1, 12_2 \ldots 12_N$ shown on both the left and right sides of the drawing, which is meant to represent that the processors $12_1, 12_2 \ldots 12_N$ initiate (left side) a message which is interpreted by network switching arrangement 10 and the results of that interpretation is returned (right side) to the initiating processors $12_1, 12_2 \ldots 12_N$. A plurality of decoders $16_1, 16_2, \ldots 16_N$ are respectively connected to the plurality of processors $12_1, 12_2, \ldots 12_N$ and respectively receive and decode the data packets $14_1, 14_2, \ldots 14_N$ to determine the intended designation thereof and to generate a corresponding decoder output signal therefor. A plurality of delay line memories $18_1, 18_2, \ldots 18_N$ are respectively connected to the plurality of decoders $16_1, 16_2, \ldots 16_N$. The delay line memories $18_1, 18_2, \ldots 18_N$ respectively have input and output stages $18A_1$–$18B_1$; $18A_2$–$18B_2$; ... $18A_N$–$18B_N$ and each of which temporarily stores the respective data $14_1, 14_2, \ldots 14_N$ by having the data circulation therein as respectively indicated by directional arrows $20_1, 20_2, \ldots 20_N$. The delay line memories $18_1, 18_2 \ldots 18_N$ may each be comprised of a fiber optic delay line memory element known in the art.

The decoders $16_1, 16_2, \ldots 16_N$ each receives a light signal, generated by a laser source 22 and routed to each of the decoders $16_1, 16_2 \ldots 16_N$ via signal path 24. The decoders $16_1, 16_2, \ldots 16_N$ provide output signals that are respectively conveyed by cables $26_1, 26_2, \ldots 26_N$. The cable $26_1$ is comprised of signal paths $26_{11}, 26_{12}, \ldots 26_{1N}$. Similarly, the cable $26_2$ is comprised of cable paths $26_{21}, 26_{22}, \ldots 26_{2N}$. Also, the cable $26_N$ is comprised of cable paths $26_{N1}, 26_{N2}, \ldots 26_{NN}$. The cables $26_1, 26_2 \ldots 26_N$ preferably comprise optical fiber cables and the signal paths $26_{11}, \ldots 26_{NN}$ comprise optical fibers. The cables $26_1, 26_2, 26_N$, are routed to the path selector arrangement 28.

The path selector arrangement 28 comprises path selector means generally illustrated as $30_1, 30_2, \ldots 30_N$ and the interconnections thereof. As further seen in FIG. 1, the signal paths of the cables $26_1, 26_2, \ldots 26_N$; e.g., $26_{11}, 26_{12}$ and $26_{1N}$ of cable $26_1$, are routed to each of the path selectors $30_1, 30_2, \ldots 30_N$. The routing of the signal paths $26_{11} \ldots 26_{NN}$ is shown in a cross-over illustration in which the signal paths $26_{11} \ldots 26_{NN}$ from the separate cables $26_1, 26_2, \ldots 26_N$ cross-over and merge at each path selectors $30_1, 30_2 \ldots 30_N$. As further seen in FIG. 1, the outputs of the path selectors $30_1, 30_2, \ldots 30_N$ are respectively routed to the processors $12_1, 12_2, \ldots 12_N$, by way of cables $32_1, 32_2, \ldots 32_N$ also preferably comprising optical fibers and each of which respectively carry the data packet $14_1, 14_2, \ldots 14_N$. Further details of the network switching arrangement 10, in particular, the decoders $16_1, 16_2, \ldots 16_N$ may be further described with reference to FIG. 2 illustrating the similar decoders, but in particular, decoder $16_1$, as comprising a plurality of elements each having a reference number and being of a type given in Table 1.

TABLE 1

| REFERENCE NO. | ELEMENT |
| --- | --- |
| 34 | CONTROL UNIT |
| 36 | ADDRESS CONVERTER |
| 38 | PERMISSION-TO-SEND TRANSMITTER |
| 40 | LIGHT PULSE RECEIVER |
| $42_1$ | WAVE GUIDE SWITCH |
| $42_2$ | WAVE GUIDE SWITCH |
| $42_N$ | WAVE GUIDE SWITCH |
| $44_1$ | PERMISSION-TO-SEND RECEIVER |
| $44_2$ | PERMISSION-TO-SEND RECEIVER |
| $44_N$ | PERMISSION-TO-SEND RECEIVER |

Figure 2A:
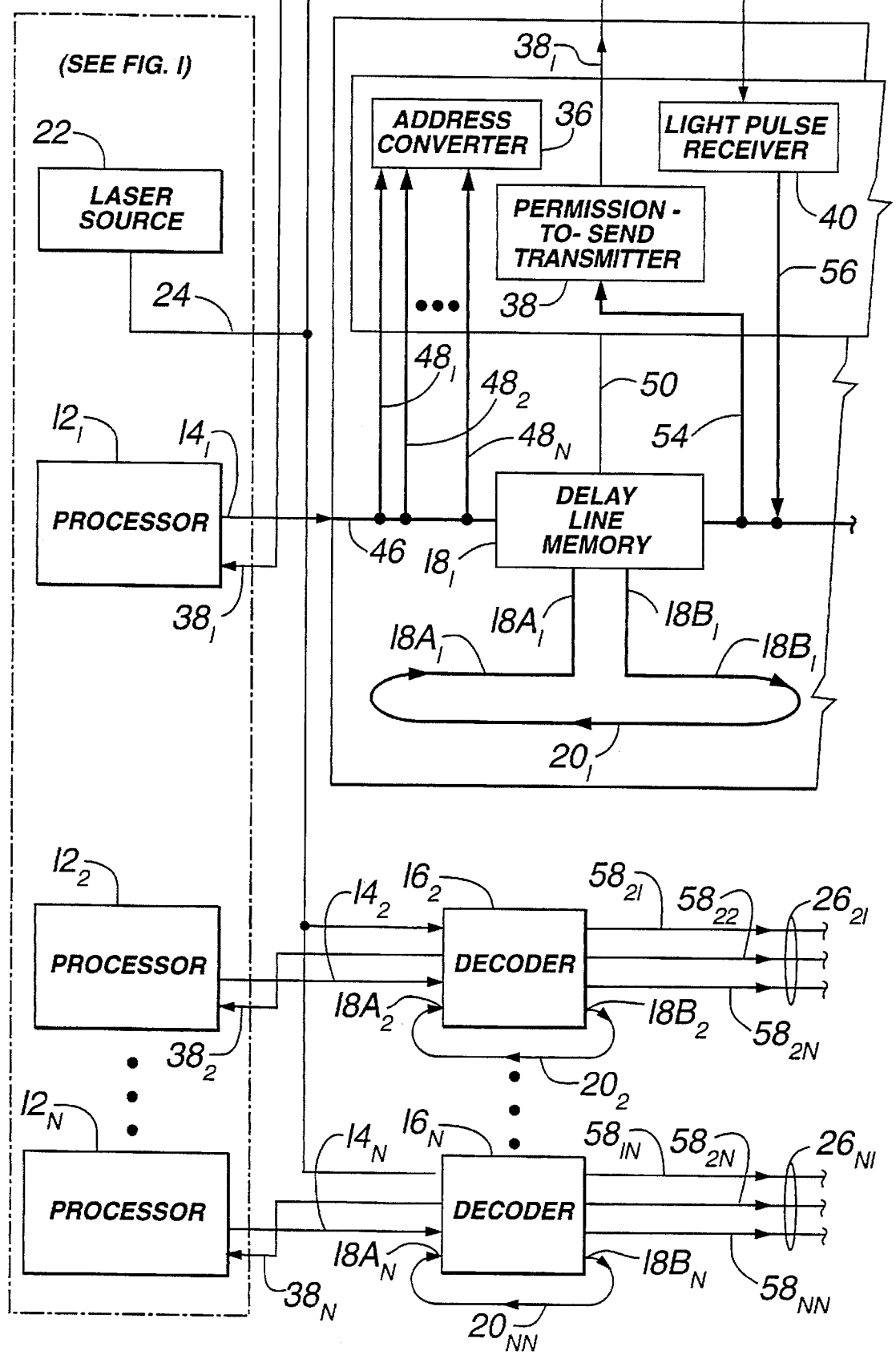
FIG. 2 illustrates a functional diagram of the decoder of the present invention.
Figure 2B:
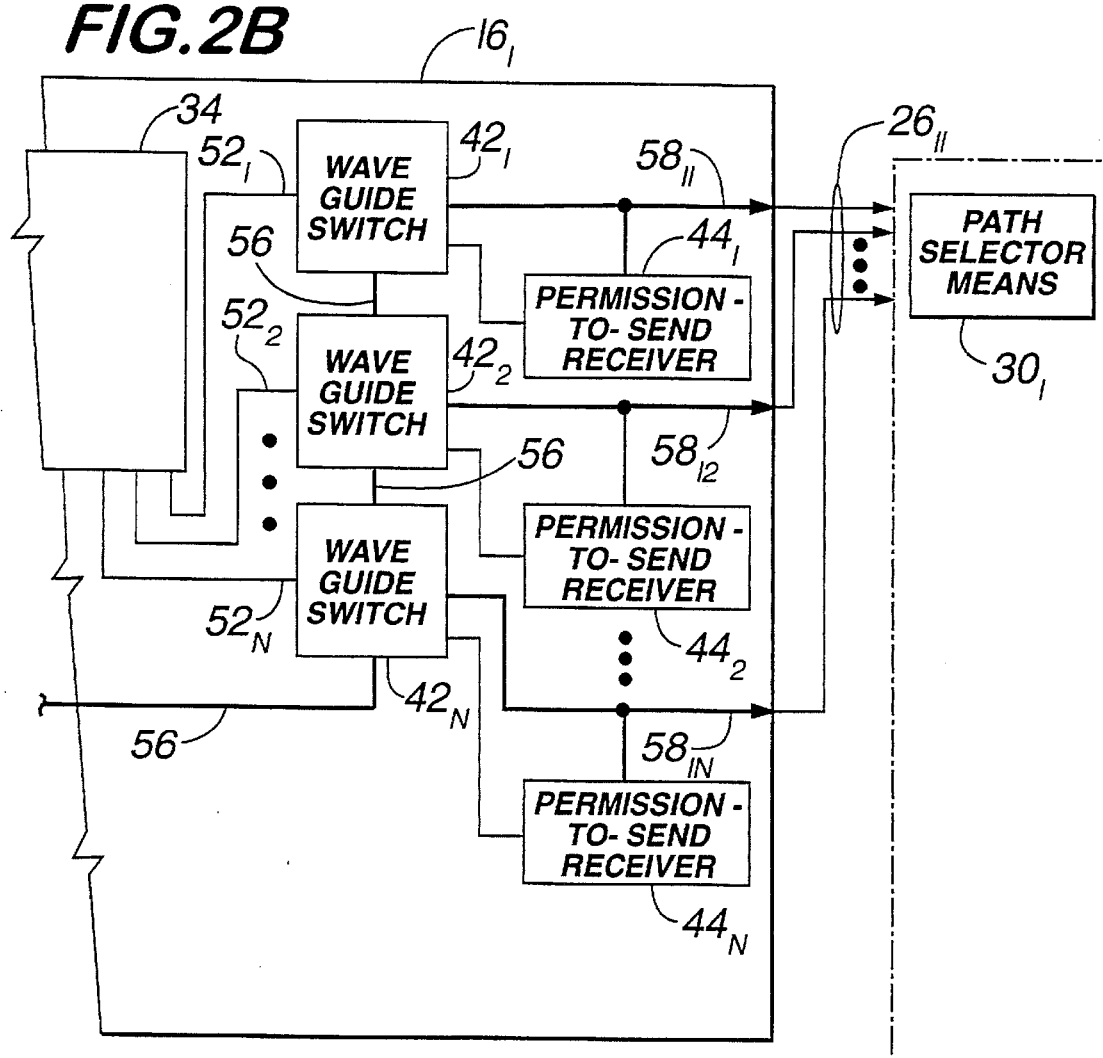
Figure 2B:
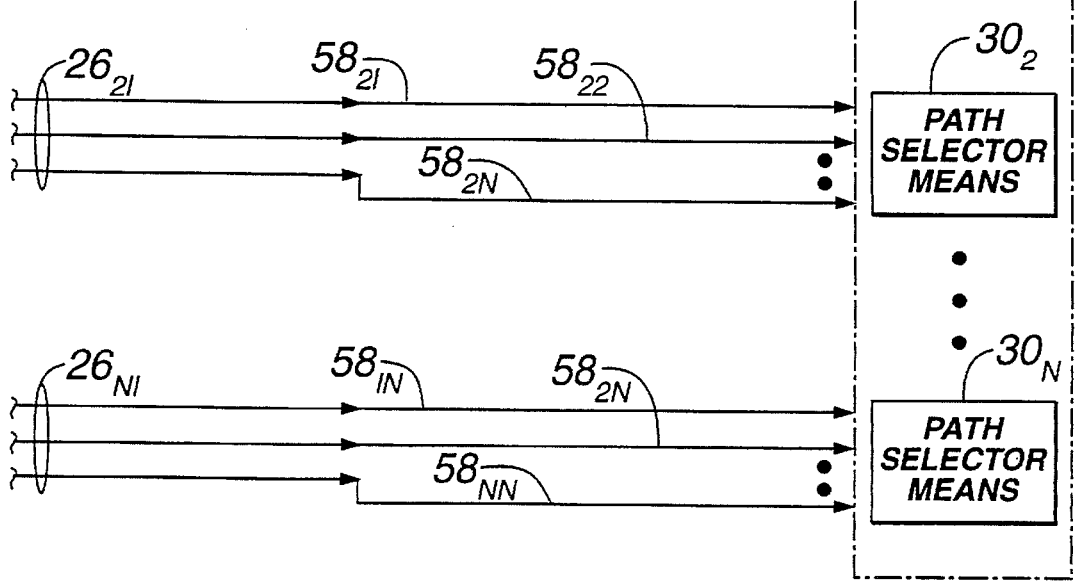

FIG. 2 illustrates a schematic of the decoder $16_1$, whereas the remaining decoders $16_2 \ldots 16_N$ are only sufficiently illustrated so as to generally show the interconnections thereof. However, it should be recognized that the hereinafter given description of decoder $16_1$, is equally applicable to the other decoders $16_2 \ldots 16_N$. The decoder $16_1$ of FIG. 2, cooperates with the delay line memory $18_1$, shown in FIGS. 1 and 2, as having its output stage $18B_1$ loop back onto its input stage $18A_1$ as indicated by directional arrow $20_1$.

Figure 3A:
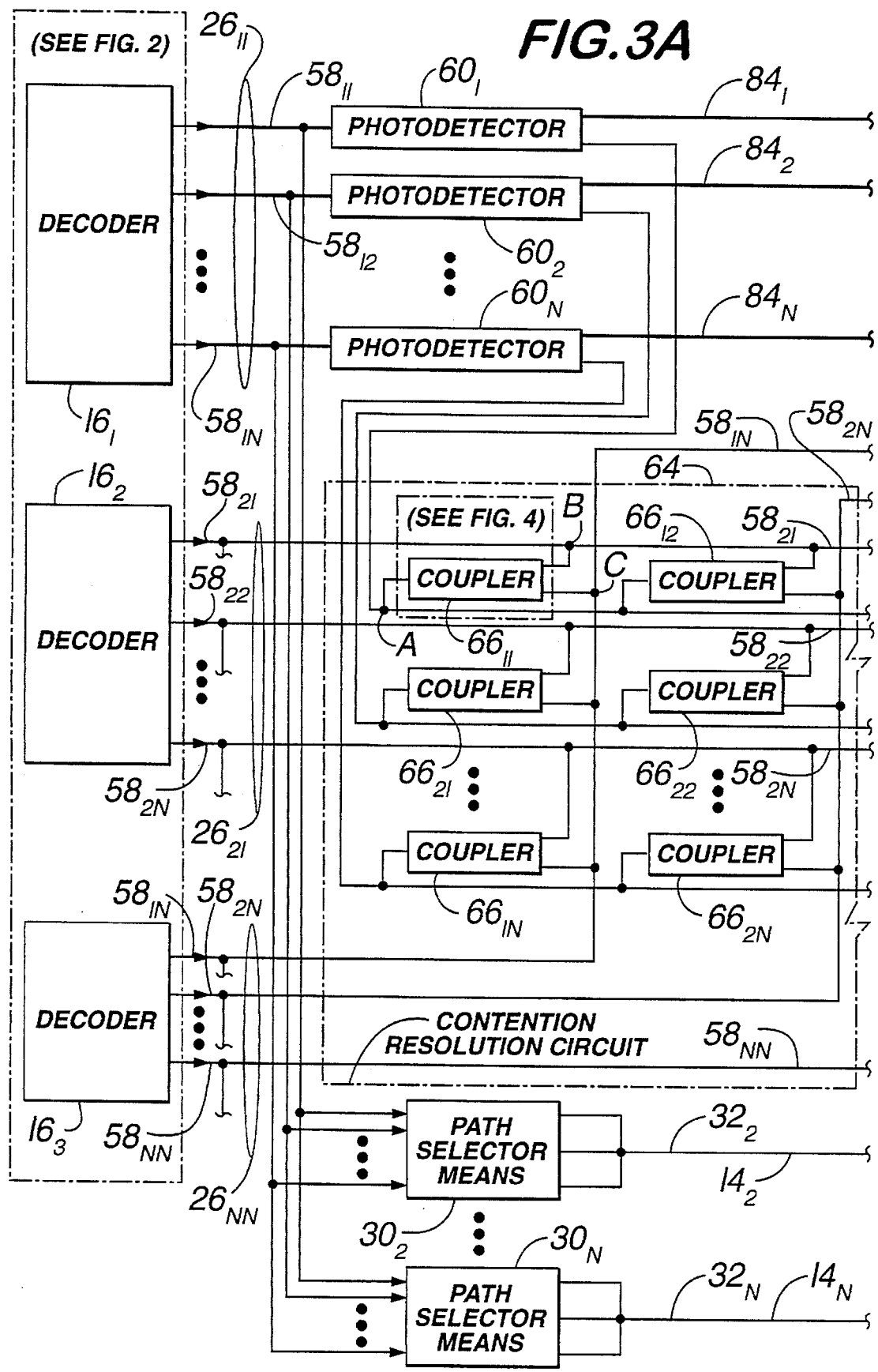
FIG. 3 illustrates the path selector means which include the contention resolution circuit both of the present invention.
Figure 3B:
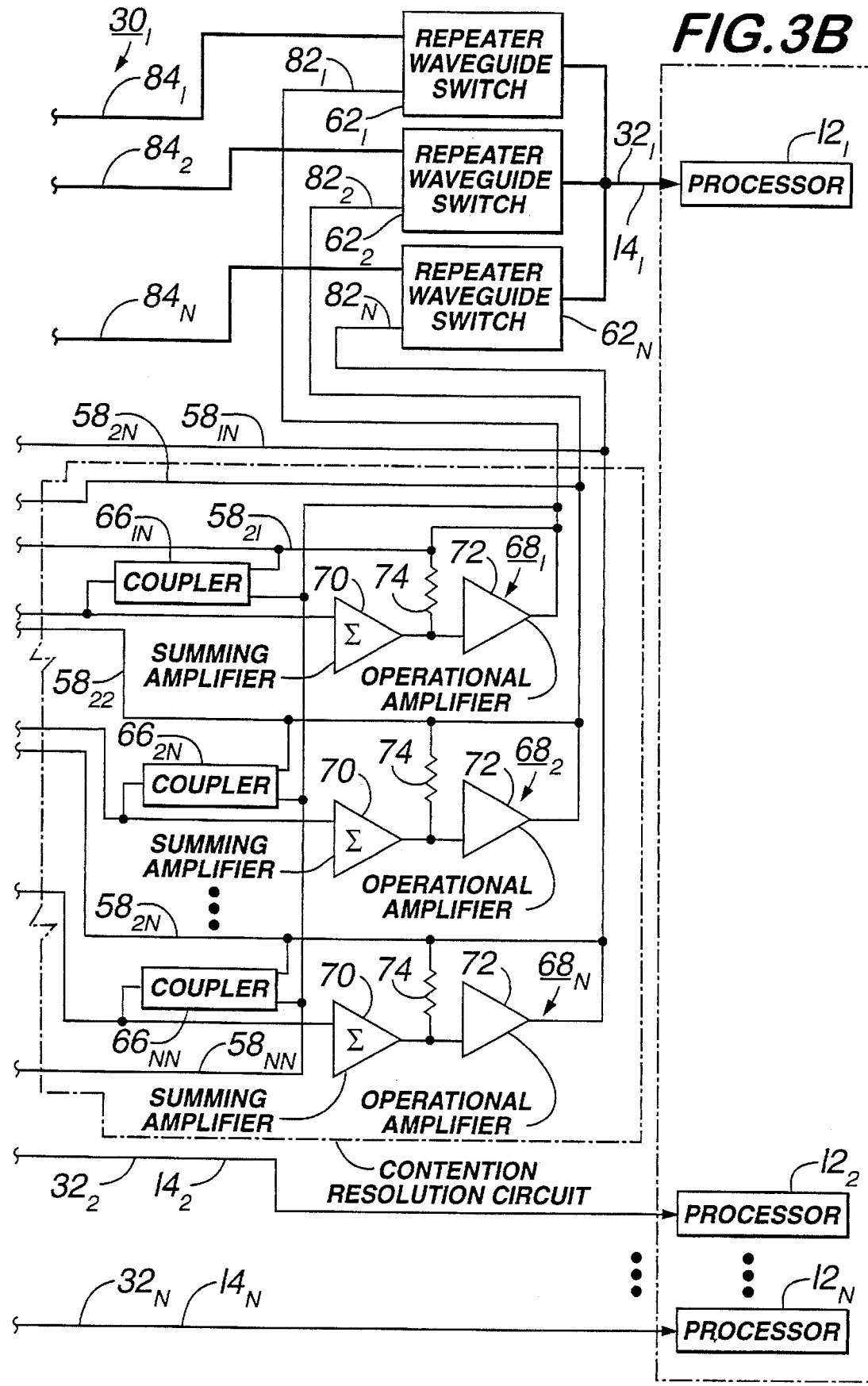

The delay line memory $18_1$ comprises a waveguide switch which, like the other waveguide switches shown in FIG. 2 and also in FIG. 3, has a movable section which may be positioned for coupling to one of several other waveguide sections, and thus passes the energy it receives to any of the other sections. However, the waveguide switch of the delay line memory 18, further comprises a section that provides a predetermined delay so as to establish a predetermined time delay from the time that the signal at the output stage $18B_1$ enters into the predetermined time delay loop and reappears at the input stage $18A_1$. This predetermined time delay may be provided by a fiber delay line element in a manner known in the art. The delay line memory $18_1$ temporarily stores, by circulating therein, the data packets $14_1$ appearing on signal path 46.

Signal path 46 conducts the data packet $14_1$ to the address converter 36 via a plurality of taps $48_1, 48_2, \ldots 48_N$ which allow the message contained in the data packet $14_1$ to be shared among the elements comprising the address converter 36 which is part of the control unit 34. The operation of the address converter 36 of the control unit 34, to be further described, in response to the particular pattern of address bits contained in the data packet $14_1$ generates a decoder output signal that appears on signal path 50 routed to delay line memory $18_1$. Further, the address converter 36 generates a corresponding particular pattern of address data that is routed to signal paths $52_1, 52_2 \ldots 52_N$ which, in turn, is routed to microwave switches $42_1, 42_2, \ldots 42_N$.

The decoder output signal present on signal path 50 activates the delay line memory $18_1$, which routes the information contained in the data packet $14_1$ into its circulating loop therein for the purpose of temporarily storing the data packet $14_1$. The delay line memory $18_1$ acts like a shift register memory unit. The control unit 34 controls, as to be described hereinafter, the operation of the permission-to-send (PTS) transmitter 38 and the receipt by light pulse receiver 40 of the laser signal present on signal path 24. The output signal of the PTS transmitter 38 of the control unit 34 of the decoder $16_1$ is routed to processor $12_1$ by way of signal path $38_1$ shown in both FIGS. 1 and 2.

The pattern of address data routed to the waveguide switches $42_1, 42_2, \ldots 42_N$ is, in turn, upon the activation of microwave switches $42_1, 42_2 \ldots 42_N$, routed to corresponding signal paths $58_{11}, 58_{12}, \ldots 58_{1N}$ which form the signal path $26_{11}$, previously discussed with reference to FIG. 1. The connections of signal paths $48_{11} \ldots 58_{1N}$ may be further described with reference to FIG. 3 primarily illustrating the path selector $30_1$ comprised of a plurality of elements, each having a reference number given in Table 2.

TABLE 2

| REFERENCE NO. | ELEMENT |
| --- | --- |
| $60_1, 60_2, \ldots 60_N$ | Photodetectors |
| $62_1, 62_2, \ldots 62_N$ | Repeater Waveguide Switches |
| 64 | Contention Resolution Circuit |
| $66_{11} \ldots 66_{NN}$ | Couplers |
| $68_1, 68_2, \ldots 68_N$ | Amplifier Array |
| 70 | Summing Amplifier |
| 72 | Operational Amplifier |
| 74 | Feedback Resistor |

In a manner similar to FIG. 2, FIG. 3 illustrates details of path selector $30_1$ and only schematically illustrates the remainder path selectors $30_2, \ldots 30_N$ so as to show the interconnections therebetween. As seen in FIG. 3, each of the decoders $16_1, 16_2, \ldots 16_N$ has each of their conductive paths, such as $58_{11} \ldots 58_{1N}$ of signal path $26_{11}$ of cable $26_1$ (see FIG. 1) of decoder $16_1$, connected to all of the path selectors $30_1, 30_2, \ldots 30_N$. It should be noted that the contents present on the corresponding and respective signal paths are brought together for analysis. For example, as seen in FIG. 3, the contents present on signal path $58_{11}$ is routed, by way of photodetector 60, to node A of coupler $66_{11}$ and combined with the contents on signal path $58_{21}$, via node B of coupler $66_{11}$, as well as combined with the contents on signal path $58_{1N}$ via node C of coupler $66_{11}$. It should be further noted that signal paths $58_{21} \ldots 58_{NN}$ of signal paths $26_{21} \ldots 26_{NN}$ of cables $26_2 \ldots 26_N$ (see FIG. 1), respectively, are also routed to each of the path selectors $30_2 \ldots 30_N$ in a manner as already generally described with reference to FIG. 1.

As further seen in FIG. 3, the data packet information, such as $14_1$, after being conditioned by elements $60_1, 60_2, \ldots 60_N$; examined by the contention resolution circuit 64 and switched by repeater waveguide switches $62_1, 62_2, \ldots 62_N$, is routed back to its respective processor $12_1$ via cable $32_1$. Still further as seen in FIG. 3, the outputs from the repeater waveguide switches $62_1, 62_2, \ldots 62_N$ are merged together and conveyed by cable $32_1$.

The contention resolution circuit 64 comprises couplers $66_{11} \ldots 66_{21} \ldots 66_{NN}$, arranged in an nxn matrix, and a plurality of amplifier arrays $68_1, 68_2 \ldots 68_N$ having a number, n, corresponding to the number of processors 12. Each of the amplifier arrays $68_1, 68_2 \ldots 68_N$ comprises summing amplifier 70, operational amplifier 72 and feedback resistor 74 arranged as shown in FIG. 3. The contention resolution circuit 64 may be of the type that is more fully described in U.S. Patent application Serial No. 08/504,342 filed Jul. 19, 1995, having Attorney Docket No. 74,560.

Figure 4:
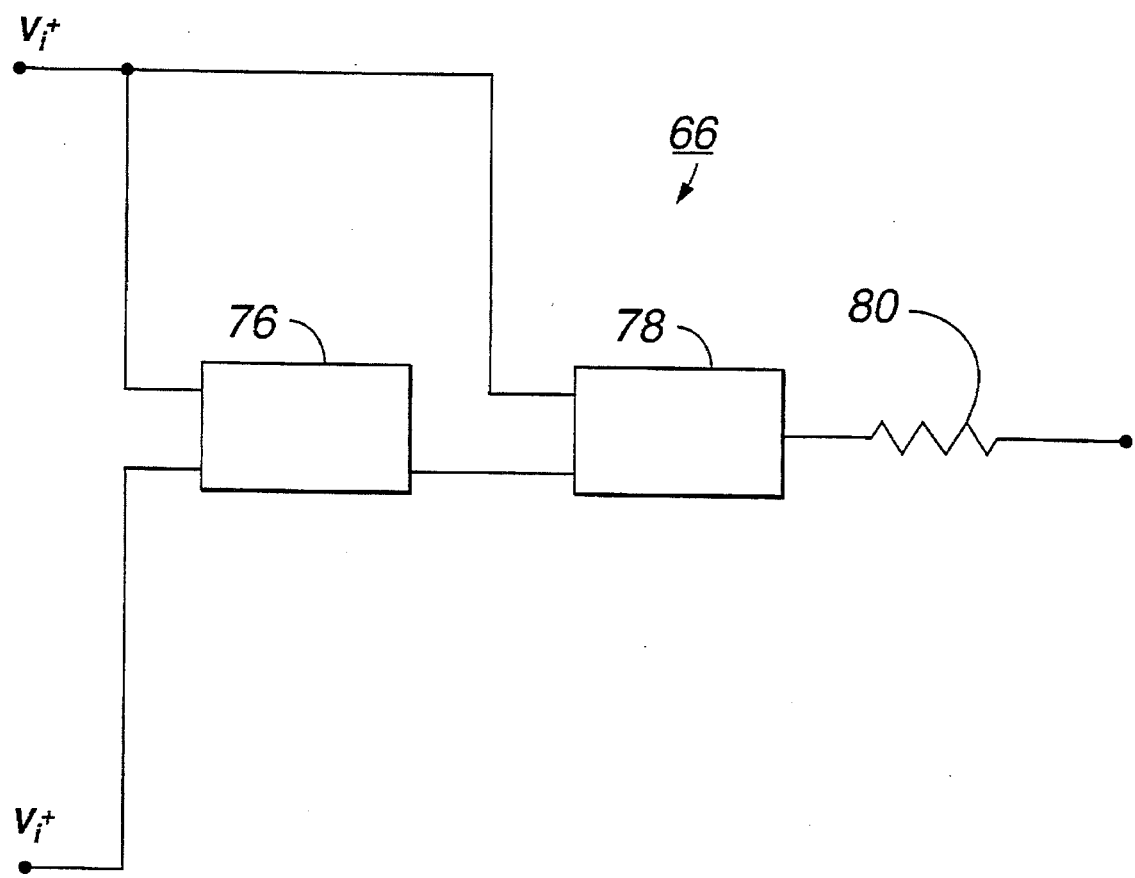
FIG. 4 illustrates further details of one of the coupling elements of FIG. 3.

In general, the contention resolution circuit 64 implements a differential system whereby, in response to the input voltages developed by photodetectors $60_1, 60_2 \ldots 60_N$, one amplifier array; e.g., $68_1$, attains a high voltage while the other amplifier arrays; e.g., $68_2 \ldots 68_N$, are driven low. The amplifier array, such as $68_1$ exhibiting the high voltage is the array to which the greatest initial input voltage is applied and which highest voltage corresponds to the decoders $16_1, 16_2, \ldots 16_N$ with the highest priority. The contention resolution circuit 64 receives the signals of interest, from all of the decoders $16_1, 16_2, \ldots 16_N$, some of which might simultaneously be present. The contention resolution circuit 64 responds to the simultaneous signal having the highest initial amplitude so as to provide priority decoding, more commonly referred to as contention resolution, of the signals of interest being generated by the plurality of decoders $16_1, 16_2, \ldots 16_N$. The contention resolution circuit 64 is particularly suited for resolving competing or contention condition that arises when two devices, such as decoders $16_1$ and $16_2$, attempt to use a single resource at the same time. In this particular case, the single resource may be a particular location in a memory element trying to be accessed by more than one processor $12_1, 12_2, \ldots 12_N$ at the same time. The contention resolution circuit 64 provides contention resolution to which device gains access to the single resource when both are in contention. As seen in FIG. 3, the contention resolution circuit 64 comprises a plurality of couplers $66_{11} \ldots 66_{NN}$ which may be further described with reference to FIG. 4 illustrating a coupler 66.

The coupler 66 comprises two analog multipliers 76 and 78 and a weighting resistor 80 arranged as shown. The coupler 66 realizes a predetermined coupling factor in which the coupling of the jth term (shown as $V_j^+$) to the ith term (shown as $V_i^+$) is proportional to the product of the voltages $V_j^+$ and $V_i^+$. The coupling weight is implemented by the resistor 80. The coupling circuits $66_{11} \ldots 66_{NN}$, in cooperation with the amplifier arrays $68_1 \ldots 68_N$, provide a dynamic process whereby one operational amplifier, such as operational amplifier 72 of amplifier array $68_1$ of FIG. 4, will eventually exhibit a high voltage (corresponding to the input from the photodetector $60_1 \ldots 60_N$ with the highest initial voltage and thus the highest light intensity) while the other amplifiers of arrays $68_2 \ldots 68_N$ will eventually exhibit a zero voltage.

OPERATION OF THE NETWORK INTERCONNECTION SWITCH ARRANGEMENT

The multi-processor computer system that includes the switching arrangement 10 as well as the plurality of processors $12_1, 12_2, \ldots 12_N$ of FIG. 1 determines when, that is, the cycle time of the network at which the various processors $12_1, 12_2, \ldots 12_N$ can, in a synchronous manner, send data packets $14_1, 14_2, \ldots 14_N$ to their respective decoder $16_1, 16_2, \ldots 16_N$. The synchronous cycle begins with the multi-processor computer system transmitting a command to the address converter 36 of the appropriate decoder $16_1, 16_2 \ldots 16_N$ which, in turn, responds by causing the PTS transmitter 38 to transmit a first control signal, identified as permission to send (PTS), to the corresponding processor $12_1, 12_2 \ldots 12_N$ respectively via signal path $38_1, 38_2, \ldots 38_N$. Upon receiving the PTS signal, the appropriate processor, such as processor $12_1$ responds by sending out a data packet $14_1$ to the decoder $16_1$ via signal path 46 which may comprise fiber optic cables. The plurality of taps $48_1, 48_2, \ldots 48_N$ carry the incoming data packet $14_1$ to the address converter 36 of FIG. 2. The address converter 36 responds to the address bits contained in the data packet $14_1$ and generates a corresponding pattern of address data that is routed to the waveguide switches $42_1, 42_2, \ldots 42_N$, via the signal paths $52_1, 52_2, \ldots 52_N$. In addition, the address converter 36, in response to the address bits, activates the delay line memory $18_1$, via signal path 50, which allows the data packet $14_1$ to be temporarily stored by being circulated in the loop of the memory switch $18_1$ by first entering the output stage $18B_1$ and then reappearing at the input stage $20_1$ at a predetermined time corresponding to less than one cycle time of the multi-processor computer system.

Simultaneously upon receiving and decoding the data packet $14_1$, the decoder $16_1$, in particular, control circuit 34 develops a pulse coded modulated (PC) signal derived (in a manner known in the art) from the laser signal generated by source 22 and received by the light pulse receiver 40 by way of signal path 24. The PCM signal has a light intensity, as known in the art, that corresponds to the data contents of the data packet $14_1$. The PCM signal, in the form of a modulated laser signal, is applied to signal path 56 which is shared by all of the waveguide switches $42_1, 42_2, \ldots 42_N$. The intensity of the PCM signal present on signal path 56 may correspond to some priority which may be continuously changed on a selected manner, known in the art, such as on a round-robin basis. The PCM signal directed to the microwave switches $42_1, 42_2, \ldots 42_N$ is respectively directed onto the signal paths $58_{11}, 58_{12}, \ldots 58_{1N}$ which, as previously described, is part of cable $26_1$ that is routed to the path selectors $30_1, 30_2 \ldots 30_N$ illustrated in FIG. 3.

The PCM signal present on signal paths $58_{11}, 58_{12}, \ldots 58_{1N}$, is respectively sampled by the photodetector $60_1, 60_2, \ldots 60_N$ and converted to a voltage proportional to its intensity. It should be noted, in actuality the PCM signal is present on more than one signal path $58_{11} \ldots 58_{NN}$ so that multiple voltage signals are developed by the multiple photodetectors $60_1 \ldots 60_N$. The voltage signals from the photodetector $60_1 \ldots 60_N$ are routed to the contention resolution circuit 64 which operates in a manner as previously described. More particularly, the contention resolution circuit 64 responds to the signal of interest developed from either of the photodetector $60_1, 60_2, \ldots 60_N$ having the highest initial amplitude and provides an output signal via its associated amplifier array, such as $68_1$, which provides a signal on signal path $82_1$ that is routed to and activates repeater waveguide switch $62_1$.

Further, at this stage, the output of the amplifier arrays $68_1, 68_2 \ldots 68_N$ is directed back to the appropriate decoder of FIG. 2 via signal paths $84_1, 84_2, \ldots 84_N$ which activates the associated PTS receiver $44_1, 44_2, \ldots 44_N$ which, in turn, routes the appropriate output of amplifier arrays $68_1, 68_2 \ldots 68_N$ to the PTS driver 38 via signal path 54. Upon the reception of the signal, serving as a second control signal, on signal path 54, control unit 34 activates the appropriate delay line memory, such as $18_1$, via signal path 50, thereby, causing the data packet $14_1$ being circulated therein to be released and directed out of the delay line memory $18_1$ and onto signal path 56 which, in turn, directs the data packet $14_1$ onto the already activated microwave switches $42_1, 42_2, \ldots 42_N$. The microwave switches $42_1, 42_2, \ldots 42_N$ and the contention resolution circuit 64, in a manner as previously described, directs the data packet $14_1$ to the repeater microwave switches $62_1, 62_2, \ldots 62_N$ which, in turn, routes the data packet $14_1$ onto the associated processor $12_1$, for controlling the program being run in the associated processor $12_1$. More particularly, the contention resolution circuit 64 allows the packets that have the highest priority to be passed from the decoders $16_1 \ldots 16_N$ to the processor $12_1 \ldots 12_N$ even if all the processors $12_1 \ldots 12_N$ simultaneously generated data packets $14_1 \ldots 14_N$.

The data packets $14_2, \ldots 14_N$ which have not been released by the control unit 34, remain respectively circulated in the delay line memories $18_2 \ldots 18_N$ and continues to do so until the contention resolution circuit 64, included in the path selectors $30_2 \ldots 30_N$, allows for the removal of the circulation data packets $14_2 \ldots 14_N$ so that the data packet $14_2 \ldots 14_N$ may be passed onto its associated processor $12_2 \ldots 12_N$. For those conditions in which there is no need for any contention resolution that is, the contents of the data packets $14_1 \ldots 14_N$ are not simultaneously present nor competing for the same resource, the path selectors $30_1, 30_2, \ldots 30_N$, allow the data packets $14_1 \ldots 14_N$ to pass onto the appropriate processor $12_1 \ldots 12_N$ on the first try. Similarly, in the case where each data packet $14_1 \ldots 14_N$ has a different destination address there is obviously no address conflicts and, therefore, no conflict resolution so that all of the data packets $14_1 \ldots 14_N$ are allowed to pass onto their respective processor on the first cycle.

The network switching arrangement 10 of the present invention also accommodates a so called "multicast operation" wherein one data packet, such as $14_1$, is simultaneously sent to multiple addresses in the same memory of the same processor $12_1$. The multicast operation relies on the operation of the contention resolution circuit 64 to allow the data packet $14_1 \ldots 14_N$ having the highest initial voltage to win priority and to send the appropriate output (previously described) from the amplifier arrays $68_1 \ldots 68_N$ back to the PTS receivers $44_1 \ldots 44_N$ which, in turn, direct the output of the amplifier arrays $68_1 \ldots 68_N$ back to the control unit 34 which releases the selected data packet $14_1 \ldots 14_N$ being circulated in the associated delay line memory $18_1 \ldots 18_N$. However, the control unit 34, operating in the multicast mode, upon receiving the output of the amplifier arrays $68_1$ ... $68_N$ also allows for a sufficient time, dependent upon the frequency of PCM signals comprising data packets $14_1 \ldots 14_N$, for the data to transverse the path selector switches $42_1 \ldots 42_N$ and repeater waveguide switches $62_1 \ldots 62_N$ and then deactivates these path selector switches $42_1 \ldots 42_N$ and repeater microwave switches $62_1 \ldots 62_N$, and activates the microwave switches $42_1, 42_2 \ldots 42_N$ associated with the multiple address of the multicast operation so that the selected data packet $14_1 \ldots 14_N$ is passed onto the appropriate processor $12_1 \ldots 12_N$. When the PTS receivers $44_1, 44_2, \ldots 44_N$ receive the signal from the associated amplifier arrays $68_1, 68_2, \ldots 68_N$, the waveguide switch $42_1$, $42_2, \ldots$ or $42_N$ is activated so that it behaves like a known optical bi-directional coupler allowing the data packet information $14_1 \ldots 14_N$ to be coupled out of the delay line memory, such as $18_1$, and then onto, via signal path 56, and the activated waveguide switch $42_1, 42_2 \ldots$ or $42_N$. In effect, the signal strength of the data packet, such as $14_1$, being circulated in the delay line memory $18_1$ is divided between at least two paths, such as $58_{11}, 58_{12}$. Because of this dividing or splitting, the data packet $14_1$ is reduced in its intensity which may degrade the quality of its transmission to and reception by the processor $12_1$. To eliminate such degradation, a portion, such as $18A_1$ or $18B_1$, of the delay line memory $18_1$ and/or a portion of the signal paths $58_{11}$, $58_{12}, \ldots 58_{1N}$, may utilize optical amplification of the optical signal comprising the data packet 141.

It should now be appreciated that the practice of the present invention provides for a network switching arrangement 10 that interconnects a plurality of processors each generating data some of which might be simultaneously present and some of which might be attempting to access the same resource. The network switching arrangement 10 comprises a contention resolution circuit 64 that services this simultaneous information by responding to the data having the highest initial voltage amplitude corresponding to the highest light intensity thereof corresponding to the highest priority. The network switching arrangement 10 provides for the necessary switching within a few cycles of the multi-processor computer system, and in some cases, when the principles of the contention resolution circuit 64, is not employed, switches the data packets within less than one clock cycle. Accordingly, the network switching arrangement 10 of the present invention provides for an improvement over previously known data packet switching arrangements that service high speed communication networks.

Obviously, many modifications and variations of the present invention are possible in light of the foregoing teachings. It is, therefore, to be understood that within the scope of the appended claims the invention may be practiced otherwise than as specifically described.

What I claim is:

1. A network switching arrangement for interconnecting a plurality of processors of a number (n) each generating data some of which data might simultaneously be present, said network switching arrangement comprising:

(a) a plurality of decoders of said number (n) respectively connected to said plurality of processors and generating a first control signal responded to by the respective processor by generating said data which are received and decoded by said connected decoder to determine an intended destination thereof and also generating a corresponding decoder output signal therefor;

(b) a plurality of delay line memories of said number (n) each having a predetermined time delay respectively connected to said plurality of decoders and responsive to said decoder output signal to temporarily store said data by circulating said data therein;

(c) a plurality of optoelectronic means respectively connected to said plurality of decoders and responsive to said decoder output signal to convert said respective data to a light pulse signal having a corresponding intensity;

(d) a plurality of path selector switches of said number (n) respectively connected to said plurality of said optoelectronic means and respectively responsive to said decoder output signals so as to transmit said respective light pulse signals;

(e) a plurality of light responsive devices of said number (n) respectively connected to said path selector switches and receiving and converting said respective light pulses into electrical voltage signals having amplitudes proportional to the corresponding light intensities;

(f) contention resolution means receiving said electrical voltage signals from each of said plurality of light responsive devices, some of said electrical voltage signals being simultaneously present, and responding to said electrical voltage signal having the highest initial amplitude and generating a respective second control signal; and (g) a plurality of repeater switches of said number (n) respectively connected to said plurality of said path selector switches to transfer said respective second control signal to said respective decoder having means responsive to said second control signal to direct said respective data being circulated in said delay line memory onto said respective repeater switches, said respective repeater switches routing said circulated data to said intended destination.

2. The network according to claim 1, wherein said data are data packets and said intended designation is a particular location in a memory of a particular interconnected processor.

3. The network according to claim 1, wherein said delay line memories comprise fiber optic delay lines.

4. The network according to claim 1, wherein said path selector switches, said repeater switches and means for connecting said plurality of decoders to said plurality of processors are waveguides.

5. The network according to claim 1, wherein said plurality of light responsive devices are photodetectors.

6. The network according to claim 1, wherein a portion of each of said plurality of path selector switches comprises a fiber optic cable having a dopant that provides amplification of the light signal being conveyed therein.

7. The network according to claim 3, wherein a portion of each of said plurality of fiber optic delay line has a dopant that provides amplification of the light signal being recirculated therein.

8. The network according to claim 1, wherein said predetermined time delay is selected to establish a minimum cycle time for responding to the data being received by the respective decoder.

9. The network according to claim 1, wherein said plurality of optoelectronic means further comprises means to alter the corresponding intensity of said light pulse signals on a priority basis based on a round-robin technique.

10. The network according to claim 1, wherein said means responsive to said second control signal for directing said data being circulated in said delay line memory onto said respective repeater switches further comprises means for providing a sufficient time to allow said data to transverse said respective repeater switch and, then, deactivate said respective path selector switch and activate the path selector switch adjacent to said deactivated said respective path selector switch.

* * * * *